FAUNT LE ROY CARTER.
HEAD LAMP CONTROL.
APPLICATION FILED DEC. 29, 1914.

1,159,471.

Patented Nov. 9, 1915.

Witnesses

Inventor
F. LeRoy Carter
By Victor J. Evans
Attorney

UNITED STATES PATENT OFFICE.

FAUNT LE ROY CARTER, OF SAN MATEO, CALIFORNIA.

HEAD-LAMP CONTROL.

1,159,471.  Specification of Letters Patent.  Patented Nov. 9, 1915.

Application filed December 29, 1914. Serial No. 879,537.

*To all whom it may concern:*

Be it known that I, FAUNT LE ROY CARTER, a citizen of the United States, residing at San Mateo, in the county of San Mateo and State of California, have invented new and useful Improvements in Head-Lamp Controls, of which the following is a specification.

This invention relates to head lamp controls for automobiles, motor cars, trucks and vehicles in general, the object in view being to provide novel means for manually controlling and turning the head lamps of a vehicle so that any desired portion of the roadway in front of the vehicle may be illuminated after dark either while the machine is standing still or in motion thereby adding greatly to the safety of night travel for vehicles, particularly those driven by motors.

With the above and other objects in view, the invention consists in the novel construction, combination and arrangement of parts, as herein described, illustrated and claimed.

Figure 1:
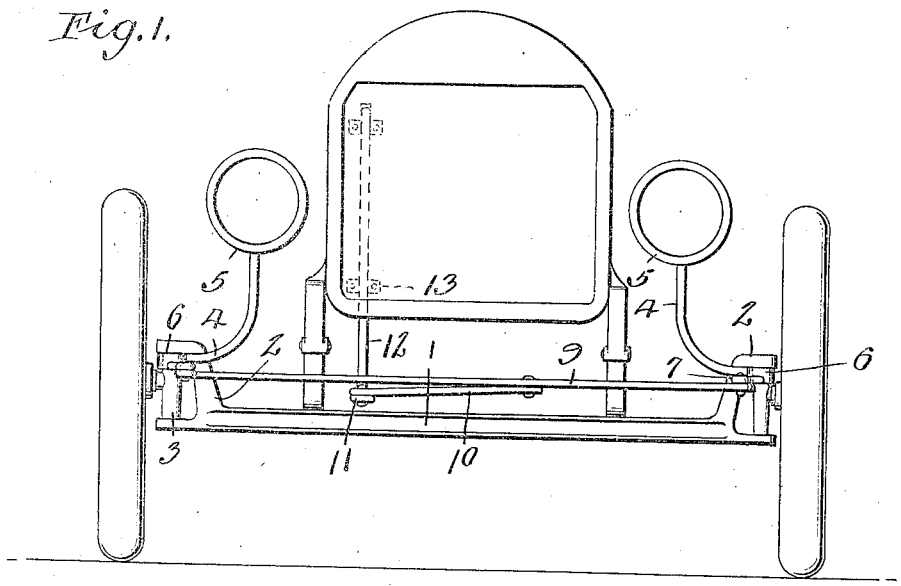
Figure 2:
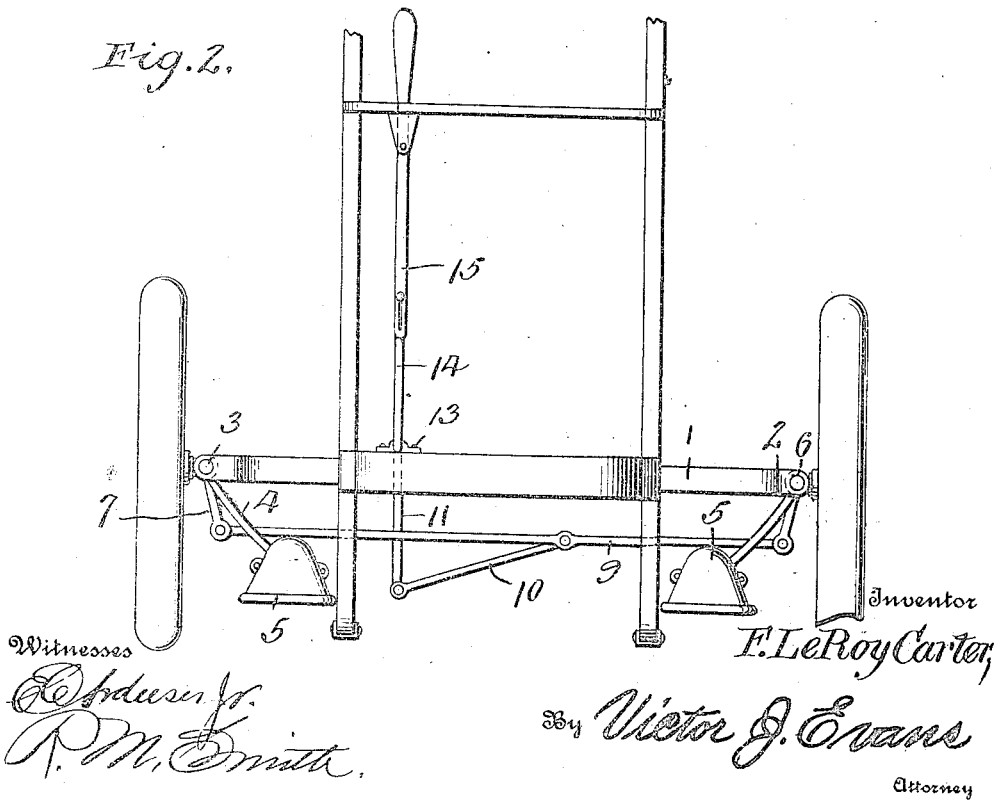

In the accompanying drawings: Figure 1 is a front elevation showing the lamp controlling mechanism of this invention mounted upon an automobile. Fig. 2 is a plan view of the same.

Referring to the drawings 1 designates the front axle of an automobile of the present day construction, the same being provided with the end forks 2 in which the steering knuckles are mounted to turn on substantially vertical axes, 3 designating the upright portions of said knuckles.

In carrying out the present invention, I employ a pair of lamp supporting members 4 on the upper ends of which the head lamps 5 are mounted. Each of said lamp supporting members embodies a bearing sleeve or collar 6 which embraces the adjacent vertical portion of the steering knuckle and is adapted to oscillate thereon. Extending horizontally from said bearing portion of each lamp supporting member is an arm 7 and these arms are connected for simultaneous operation by means of a rod 9. Connected to a suitable point on the rod 9 is a link 10, said link having a jointed connection with the rod at one end and also having a jointed connection at its opposite end with the free end portion of an operating arm 11 on a vertically extending rock shaft 12 which is mounted in one or more bearings 13 on a convenient part of the machine. This rock shaft is provided with another arm 14 from which an operating rod or bar 15 extends rearwardly to a point within reach of the operator in his seat in the machine. Whether the machine is in motion or standing still, the operator may thus turn both of the head lamps to one side or the other so as to investigate the road in front of the machine and determine the best course to follow under the circumstances. This adds greatly to the safety of night travel.

What I claim is:—

In head lamp controlling mechanism for vehicles, the combination of a pair of lamp-supporting members having bearing portions embracing and adapted to be oscillated around the vertical portions of the steering knuckles, arms extending from said lamp-supporting members, a rod connecting said arms, and manually operated means connected with said rod for turning said lamp-supporting members.

In testimony whereof I affix my signature in presence of two witnesses.

FAUNT LE ROY CARTER.

Witnesses:
CLAUDE H. MOORE,
JOHN H. PEASE.